United States Patent
Edington

(10) Patent No.: US 10,947,912 B2
(45) Date of Patent: Mar. 16, 2021

(54) GASOLINE ENGINE KNOCK CONTROL

(71) Applicant: JAGUAR LAND ROVER LIMITED, Warwickshire (GB)

(72) Inventor: Ian Edington, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 0 days.

(21) Appl. No.: 16/541,526

(22) Filed: Aug. 15, 2019

(65) Prior Publication Data

US 2019/0368430 A1    Dec. 5, 2019

Related U.S. Application Data

(63) Continuation of application No. 15/032,088, filed as application No. PCT/EP2014/072199 on Oct. 16, 2014, now abandoned.

(30) Foreign Application Priority Data

Oct. 28, 2013  (GB) ..................... 1319014

(51) Int. Cl.
*F02D 35/02* (2006.01)
*F02D 37/02* (2006.01)
(Continued)

(52) U.S. Cl.
CPC ............. *F02D 35/027* (2013.01); *F01L 1/14* (2013.01); *F01L 9/02* (2013.01); *F01L 9/04* (2013.01);
(Continued)

(58) Field of Classification Search
CPC ............ F02D 13/0203; F02D 13/0207; F02D 13/0215; F02D 13/0219; F02D 13/0223;
(Continued)

(56) References Cited

U.S. PATENT DOCUMENTS 3,930,474 A * 1/1976 Kawai ..................... F02P 5/106
123/406.11
4,133,332 A    1/1979 Benson et al.
(Continued)

FOREIGN PATENT DOCUMENTS

CN    203130181 U    8/2013
DE    4324837 A1    1/1995
(Continued)

OTHER PUBLICATIONS

International Search Report and Written Opinion of the International Searching Authority for International application No. PCT/EP2014/072199 dated Jan. 20, 2015.
(Continued)

*Primary Examiner* — John M Zaleskas
(74) *Attorney, Agent, or Firm* — Carlson, Gaskey & Olds

(57) ABSTRACT

Various methods of control of combustion knock are disclosed in relation to a spark ignition, internal combustion engine having active tappets, whereby an inlet poppet valve can be moved independently of the usual operating cam. In one embodiment the invention provides for combustion knock to be controlled solely by variation of inlet air charge.

11 Claims, 2 Drawing Sheets

(51) Int. Cl.
*F01L 1/14* (2006.01)
*F01L 9/02* (2006.01)
*F01L 9/04* (2006.01)
*F02D 41/00* (2006.01)
*F02D 41/26* (2006.01)
*F02D 13/02* (2006.01)
*F02P 5/152* (2006.01)

(52) U.S. Cl.
CPC ..... *F02D 13/0207* (2013.01); *F02D 13/0226* (2013.01); *F02D 37/02* (2013.01); *F02D 41/0002* (2013.01); *F02D 41/0025* (2013.01); *F02D 41/26* (2013.01); *F02P 5/152* (2013.01); *F02D 2041/001* (2013.01); *F02D 2200/021* (2013.01); *F02D 2200/0611* (2013.01); *Y02T 10/12* (2013.01); *Y02T 10/40* (2013.01)

(58) Field of Classification Search
CPC ............. F02D 13/0226; F02D 13/0234; F02D 13/0238; F02D 13/0261; F02D 35/027; F02D 37/02; F02D 41/0002; F02D 41/0025; F02D 2041/001; F02P 5/152; F02P 5/1527
USPC ... 123/90.15, 406.29, 406.3, 406.31, 406.32; 701/105, 111
See application file for complete search history.

(56) References Cited

U.S. PATENT DOCUMENTS

| | | | |
|---|---|---|---|
| 4,164,917 A | 8/1979 | Glasson | |
| 4,367,711 A * | 1/1983 | Ikeura | F02P 5/1506 123/406.55 |
| 5,140,955 A * | 8/1992 | Sono | F01L 9/025 123/435 |
| 5,309,872 A * | 5/1994 | Filippi | F01L 1/08 123/90.15 |
| 5,509,394 A * | 4/1996 | Hitomi | F02B 33/38 123/559.1 |
| 5,875,763 A * | 3/1999 | Mottier | F02P 3/0456 123/406.13 |
| 6,971,360 B2 * | 12/2005 | Katayama | F02B 61/045 123/192.1 |
| 7,594,497 B2 * | 9/2009 | Miyanoo | F02D 9/02 123/399 |
| 8,041,497 B2 * | 10/2011 | Bidner | F02D 41/0025 123/316 |
| 8,176,888 B2 * | 5/2012 | Reiche | F02D 41/0025 123/179.7 |
| 2004/0055571 A1 * | 3/2004 | Hashizume | F02D 13/023 123/406.29 |
| 2004/0244732 A1 | 12/2004 | Kojic et al. | |
| 2005/0005908 A1 * | 1/2005 | Tanei | F02D 13/0238 123/406.33 |
| 2005/0229901 A1 * | 10/2005 | Weber | F01L 9/02 123/316 |
| 2006/0016407 A1 * | 1/2006 | Miyanoo | F01L 1/34 123/90.15 |
| 2006/0107924 A1 * | 5/2006 | Miyanoo | F02D 13/0215 123/406.19 |
| 2006/0225700 A1 | 10/2006 | Ramappan et al. | |
| 2007/0119421 A1 | 5/2007 | Lewis et al. | |
| 2008/0092834 A1 * | 4/2008 | Stein | F01L 13/0036 123/90.15 |
| 2008/0228375 A1 * | 9/2008 | Ashida | F02D 19/08 701/103 |
| 2009/0199817 A1 * | 8/2009 | Mikasa | F02P 5/1506 123/406.19 |
| 2009/0308070 A1 | 12/2009 | Alger, II et al. | |
| 2010/0049420 A1 * | 2/2010 | Smith | F02D 13/0238 701/103 |
| 2010/0236523 A1 * | 9/2010 | Saruwatari | F01L 1/34403 123/436 |
| 2010/0241323 A1 * | 9/2010 | Cunningham | F02D 37/02 701/54 |
| 2011/0083640 A1 * | 4/2011 | Garagnani | F02D 13/0219 123/406.29 |
| 2012/0031373 A1 * | 2/2012 | Brennan | F01L 9/02 123/436 |
| 2012/0260872 A1 | 10/2012 | Borean | |
| 2012/0290193 A1 | 11/2012 | Suzuki et al. | |
| 2016/0265455 A1 * | 9/2016 | Edington | F02D 41/26 |

FOREIGN PATENT DOCUMENTS

| | | |
|---|---|---|
| FR | 2796417 | 1/2001 |
| JP | 56-141030 A | 11/1981 |
| JP | 61190131 A | 8/1986 |
| JP | 08193530 | 7/1996 |
| JP | H0968146 | 3/1997 |
| JP | H11324762 | 11/1999 |
| JP | H11324786 | 11/1999 |
| JP | H111324762 A | 11/1999 |
| JP | 2000045805 A | 2/2000 |
| JP | 2004263633 | 9/2004 |
| JP | 2005069204 | 3/2005 |
| JP | 2005188334 | 7/2005 |
| JP | 2007247569 | 9/2007 |
| JP | 2008175177 | 7/2008 |
| JP | 2008267362 A | 11/2008 |
| JP | 2010071151 A | 4/2010 |
| JP | 2010168939 | 8/2010 |
| JP | 2010190193 A | 9/2010 |
| JP | 2011122504 | 6/2011 |
| JP | 2011256725 | 12/2011 |
| JP | 2013522519 | 6/2013 |

OTHER PUBLICATIONS

Combined Search and Examination Report under Sections 17 and 18(3) for Application No. GB1319014.5 dated May 23, 2014.
Supplementary Search Report for Chinese Application No. 201480058912.2 dated Sep. 13, 2018.
EPO Communication pursuant to Article 94(3) EPC for Application No. 14 784 254.6 dated May 4, 2018.

* cited by examiner

GASOLINE ENGINE KNOCK CONTROL

CROSS REFERENCE TO RELATED APPLICATIONS

This application is a continuation of U.S. patent application Ser. No. 15/032,088, filed on Apr. 26, 2016, which is a national stage application of International Application No. PCT/EP2014/072199, filed Oct. 16, 2014, which claims priority to the United Kingdom Application GB 1319014.5, filed Oct. 28, 2013.

TECHNICAL FIELD

This invention relates to reciprocating piston internal combustion engines having a knock sensor, and to a method of knock control for such engines.

BACKGROUND

Spark ignition piston engines are generally arranged to operate with a high degree of ignition advance so as to ensure optimum combustion and power output. The required amount of ignition advance generally increases with engine speed, and systems have been developed to ensure that the desired ignition advance is applied for all conditions of speed and load. Such systems form no part of the present invention, but are well known; in one example a characteristic of ignition advance is provided in a look-up table of an electronic engine control unit (ECU).

The amount of ignition advance is generally limited by combustion 'knock', which is a well known phenomenon in which spark induced combustion becomes somewhat unstable. Combustion knock can be very damaging to engine components. Many circumstances contribute to initiation of knock, and a conventional method for minimizing knock includes a knock sensor, which is essentially a microphone for distinguishing sound frequencies associated with knock from other combustion related noise. Upon detection of knock, an ignition control system immediately retards ignition until knock ceases, and a suitable control loop is provided to ensure optimum ignition advance at all conditions of engine speed and load.

Ignition based knock control systems may operate on a cylinder by cylinder basis for multi-cylinder engines, and have a response rate capable of reducing knock within one combustion cycle.

Some gasoline engines cannot run at the optimum ignition timing throughout the entire speed range due to the combustion knock phenomenon. Thus an engine may be 'knock limited' for certain conditions of speed and load, and in order to achieve high combustion efficiency in such conditions, the engine must be operated as close as possible to the knock limit.

Retarding the timing of an ignition spark to avoid knock is a rapid means of response, and can eliminate knock immediately—i.e. within one combustion cycle. Typically the amount of ignition retardation for each successive combustion cycle is however limited, so that ignition advance will be progressively reduced (and re-advanced) by small amounts to optimize combustion without knock.

Although knock control by reducing the degree of ignition advance is a rapid and useful technique, it has certain disadvantages.

Instant retardation of ignition timing means that combustion of the air/fuel mixture in the associated cylinder is inefficient. Additional waste heat is generated instead of power, which adds to the heat load on the engine cooling and exhaust systems. Put another way, excess fuel is present at the time of the ignition spark, which results in both a greater fuel consumption than is commensurate with the power produced from the combustion event, and a greater volume of exhaust emissions.

The additional heat load caused by retarding the ignition spark has another consequence, because a hot engine is more prone to knock. As the engine becomes hotter, the knock condition becomes worse, and a very disadvantageous control cycle may be the result.

Vehicle engines should preferably run safely on a wide range of fuels, notwithstanding that optimum performance may require premium 95 RON octane. Where low grade fuel is used, e.g. 91 RON octane, a high degree of ignition retardation may be used to protect the engine from knock, and this inevitably results in excessive temperatures in the engine and in the cooling and exhaust systems.

It is theoretically possible to address combustion knock by some variation of operation of the usual inlet and exhaust valves of an engine, but in practice the response time for moving conventional camshaft and like elements is too long, and may be an order of magnitude greater than the time to vary ignition timing.

What is required is a rapid means and method of providing control of combustion knock that ensures optimum ignition timing and combustion efficiency. Additionally a capability to run on low grade fuel, as low as 85 RON octane, should be possible.

SUMMARY

According to an aspect of the invention there is provided a method of combustion knock control in a reciprocating piston internal combustion engine having a combustion chamber, a poppet valve at the inlet to said combustion chamber, an inlet manifold upstream of said valve, and a throttle valve at the inlet to said manifold, said engine further including an active tappet for said inlet valve whereby valve operation may be adjusted on demand, said method comprising:
  a) detecting combustion knock during a combustion event in a combustion chamber;
  b) commanding said active tappet to vary operation of the associated valve in a knock reducing manner for the subsequent combustion event in said chamber, and
  c) repeating steps a) and b) for successive combustion events in said chamber until combustion knock is not detected.

The method is intended to operate continually so that a conventional knock sensor is provided to listen for knock in the combustion chamber of the or each cylinder.

The invention provides for the use of an active tappet to vary the volume and/or timing of admission of air into the combustion chamber and/or timing of the exhaust of combustion gas from the combustion chamber so as to reduce the likelihood of knock on the next combustion event in that combustion chamber. Accordingly the invention can provide for knock control within one combustion cycle.

An active tappet provides for substantially immediate change of operation of the associated valve on an event by event basis. Such a tappet may include a hydraulic chamber whose volume is controlled by an electrically actuated valve, such as a bleed valve, responsive to a command from an engine ECU.

In one embodiment the active tappet may be between a camshaft and an inlet valve, so as to transmit camshaft lift to said valve. However the active tappet provides for operation of the associated valve independently of the camshaft or other valve control device.

The air charge may be controlled by an active tappet, according to one or more of the following techniques:

varying valve lift so as to increase or decrease the maximum opening of the poppet valve during an activation cycle. If the opening and closing timing is unchanged, an increased lift will increase the volume of aspirated air, and a reduced lift will reduce the volume of aspirated air.

varying the duration of valve opening, either by re-timing valve opening, re-timing valve closing, or both. If the valve lift is unchanged, a longer open duration will tend to increase the volume of aspirated air, and a shorter duration will tend to reduce the volume of aspirated air.

varying the overlap of inlet and exhaust valves, by re-timing the opening of the inlet valve to increase or reduce overlap with operation of the exhaust valve. Reduced overlap will tend to increase the volume of air available for combustion, whereas increased overlap will tend to reduce the volume of air available for combustion.

The volume of air available for combustion may be reduced by directly reducing the volume of a fresh air charge, or by controlling valve overlap to retain a greater proportion of combustion gases within a combustion chamber; such gases are inert and cannot contribute towards combustion.

If an active tappet is also provided for an exhaust valve of the combustion chamber, valve overlap may be varied by means of the inlet valve tappet, the exhaust valve tappet, or both.

Knock reduction or knock elimination is generally achieved by providing a reduced volume of air for combustion. Accordingly ignition retardation may not be required to achieve knock control in successive combustion events, and combustion may be at the optimum ignition timing. As a result fuel consumption and exhaust emissions are reduced, whilst the waste heat of the prior art method is not generated.

The control method of the invention may include:
d) detecting the absence of combustion knock in said combustion chamber.
e) commanding said active tappet to vary operation of the associated valve in a knock approaching manner for the subsequent combustion event in said chamber, and
f) repeating steps d) and e) until combustion knock is again detected.

A knock approaching variation will tend to increase the volume of air available for combustion, for example by directly increasing the air charge volume, or by reducing the proportion of combustion gases remaining in the combustion chamber.

Accordingly the invention may provide a complete knock control method whereby combustion knock (or the absence thereof) is sensed to the intent that ignition advance is optimum for all conditions of engine speed and load.

The appropriate values for ignition advance and valve operation (air admission) may be determined empirically by known methods for all operating conditions of an engine, in particular speed, load, temperature, altitude and other relevant parameters. These values may be stored, for example, in a look-up table of the ECU, or determined by reference to an appropriate algorithm.

In an embodiment of the invention, variation of ignition timing may be used in conjunction with variation of valve operation to achieve a faster response time than would be achievable by either method used alone, or where the use of either method alone may be compromised by other operating considerations for the engine.

According to an aspect of the invention there is provided a method of combustion knock control in a spark ignition, reciprocating piston internal combustion engine having a combustion chamber, a poppet valve at the inlet to said combustion chamber, an inlet manifold upstream of said valve, and a throttle valve at the inlet to said manifold, said engine further including an active tappet for said inlet valve whereby valve operation may be adjusted on demand, and a system of varying the timing of an ignition spark, said method comprising:
a) providing a threshold operating temperature for said engine;
b) below said threshold permitting treatment of combustion knock by operation of said active tappet and/or by operation of said system; and
c) above said threshold permitting treatment of combustion knock solely by operation of said active tappet.

This aspect of the invention permits treatment of knocking at elevated engine temperatures, such as encountered in high ambient temperatures or when under load during, for example, towing. The technique of retarding ignition to treat combustion knock is not used above a threshold temperature, which can be determined empirically according to vehicle and engine type. Accordingly, the progressively worsening control cycle, due to retarded ignition raising engine temperature, is avoided.

In an embodiment the ignition timing is fixed at the value associated with crossing the temperature threshold upwardly, and remains fixed until the next crossing of the temperature threshold in a downward direction. During this period, knocking is controlled solely by the active tappet(s) to vary the air charge on each successive combustion event.

According to an aspect of the invention, there is provided a method of obtaining an optimum air charge without combustion knock in a spark ignition reciprocating piston internal combustion engine having a combustion chamber, a poppet valve at the inlet to said combustion chamber, an inlet manifold upstream of said valve, and a throttle valve at the inlet to said manifold, said engine further including an active tappet for said inlet valve whereby valve operation may be adjusted on demand and a system of varying the timing of an ignition spark, said method comprising:
a) commanding said active tappet to vary the air charge admitted to said combustion chamber, and in conjunction varying the timing of an ignition spark, to achieve optimum fuel economy for all positions of said throttle value.

By this method optimum fuel economy can be obtained without combustion knock by achieving the optimum balance of air charge and ignition timing according to known engine operating parameters.

According to an aspect of the invention, there is provided a method of combustion knock control in a spark ignition reciprocating piston internal combustion engine having a combustion chamber, a poppet valve at the inlet to said combustion chamber, an inlet manifold upstream of said valve, and a throttle valve at the inlet to said manifold, said engine further including an active tappet for said inlet valve whereby valve operation may be adjusted on demand and a system of varying the timing of an ignition spark, the method comprising:
for higher octane fuel, controlling combustion knock solely by varying the timing of an ignition spark; and for lower octane fuel, controlling combustion knock by a combination of varying the timing on an ignition spark and commanding said active tappet to vary the air charge admitted to said combustion chamber.

In this aspect a convenient solution is provided for occasions when only a lower octane fuel is available. Lower octane fuels are more prone to combustion knock, and accordingly an engine designed to require a certain minimum octane rating may suffer combustion knock if a lower octane fuel is provided. A vehicle driver may realise that lower octane fuel has been supplied, but this embodiment allows a wider range of octanes to be accommodated by allowing for air charge variation via the active tappet(s).

According to an aspect of the invention, there is provided a method of improving rotational smoothness of a multi-cylinder reciprocating piston internal combustion engine having for each cylinder a combustion chamber, a respective poppet valve at the inlet to each chamber, an inlet manifold upstream of said valves, and a throttle valve at the inlet to said manifold, said engine further including an active tappet for said inlet valve whereby valve operation may be adjusted on demand, said method comprising:
a) detecting that one cylinder has combustion knock during a combustion event that is worse than any other cylinder;
b) commanding the corresponding active tappet to vary operation of the associated valve in a knock reducing manner for the subsequent combustion event in said one cylinder, and
c) repeating steps a) and b) for successive combustion events in said one cylinder until combustion knock is no worse in said one cylinder than in any other cylinder.

This aspect provides for the cylinder with the worst combustion knock to be treated independently of the other cylinders, by variation of air charge via the active tappet(s). The worst cylinder may vary continually amongst all cylinders of the engine, and accordingly the method may be applied continually to different cylinders in order to achieve smooth running of the engine.

Aspects of the invention may be applied to an electric control unit having a processor and/or memory to implement the methods, to an internal combustion engine having one or more active tappet(s), and to a vehicle so equipped.

In each aspect of the invention, the or each active tappet may be between a camshaft and the associated inlet or exhaust valve.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF DRAWINGS

Other features of the invention will be apparent from the following description of an embodiment, described by way of example only with reference to the accompanying drawings in which.

DESCRIPTION OF EMBODIMENTS

Figure 1:
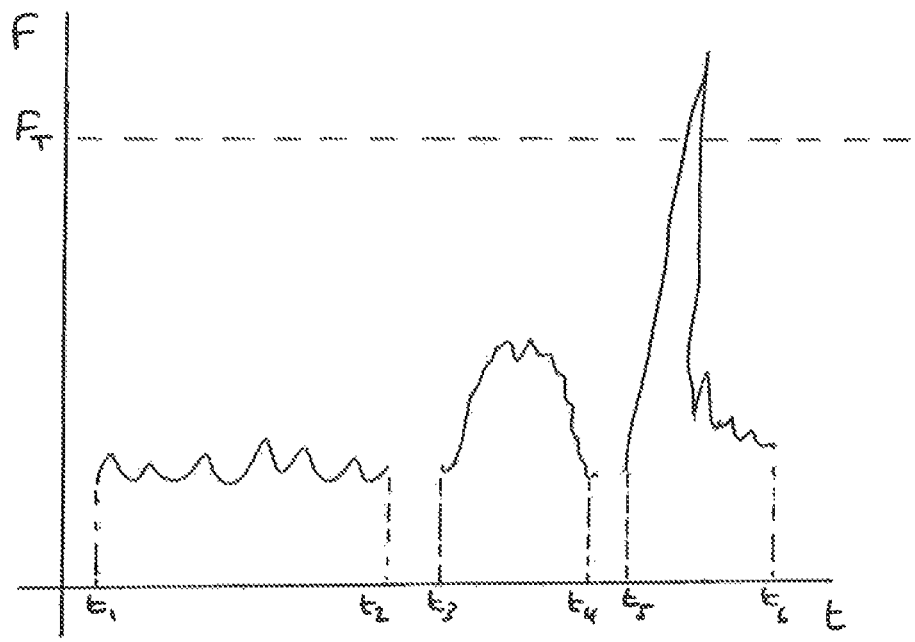
FIG. 1 illustrates exemplar noise profile of events within an engine combustion chamber.

With reference to the drawings, FIG. 1 illustrates an exemplar noise profile from the combustion chamber of an internal combustion engine. A conventional knock sensor listens to such noise to determine breach of a threshold ($F_T$), to distinguish a knock event ($t_5$-$t_6$) from background noise ($t_1$-$t_2$) and a normal combustion event ($t_3$-$t_4$). Upon such detection an electronic signal is passed to the ignition control module of the ECU, and the vehicle ignition is conventionally retarded until the knock sensor ceases to detect knock. Thereafter ignition may again be advanced. The shape of the traces in FIG. 1 is representative of typical combustion events, and is not an illustration of a real combustion sequence.

Figure 2:
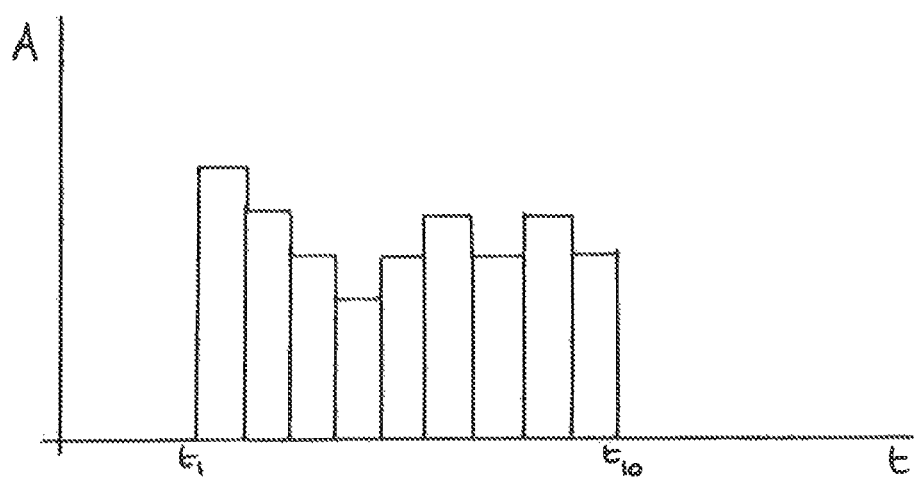
FIG. 2 illustrates a prior art ignition response to knock sensing.

FIG. 2 illustrates a typical prior art control strategy where successive combustion events are indicated by 9 blocks between $t_1$ and $t_{10}$. At $t_1$ knock is sensed, and ignition is retarded by a small amount for the next combustion event. In the illustration knock is sensed for three successive combustion events, each being followed by a further retardation. In the fourth block knock is not sensed, and ignition is again advanced for the next two blocks. In block 6 knock is again sensed, followed by a retardation in block 7, an advance in block 8, and a further retardation due to knock sensing in block 9.

The amount of retardation and advance applied in each block is determined by the skilled technician according to the capabilities of the engine and of the control system. Although in this example the step change is the same for both retardation and advance, it need not be. By this means knock can be controlled throughout the operating envelope of the engine.

Figure 3:
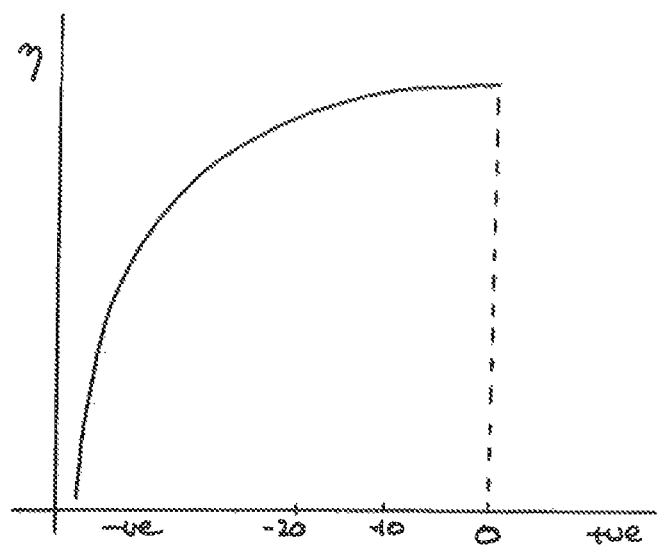
FIG. 3 illustrates the effect of ignition retardation upon combustion efficiency.

FIG. 3 illustrates how combustion efficiency ($\eta$) varies with retardation of ignition from the optimum point (0). A small degree of retardation (−10°), depending upon operating circumstances, may have a relatively small effect upon efficiency, whereas a large retardation (−20°) has a comparatively large effect.

Figure 4:
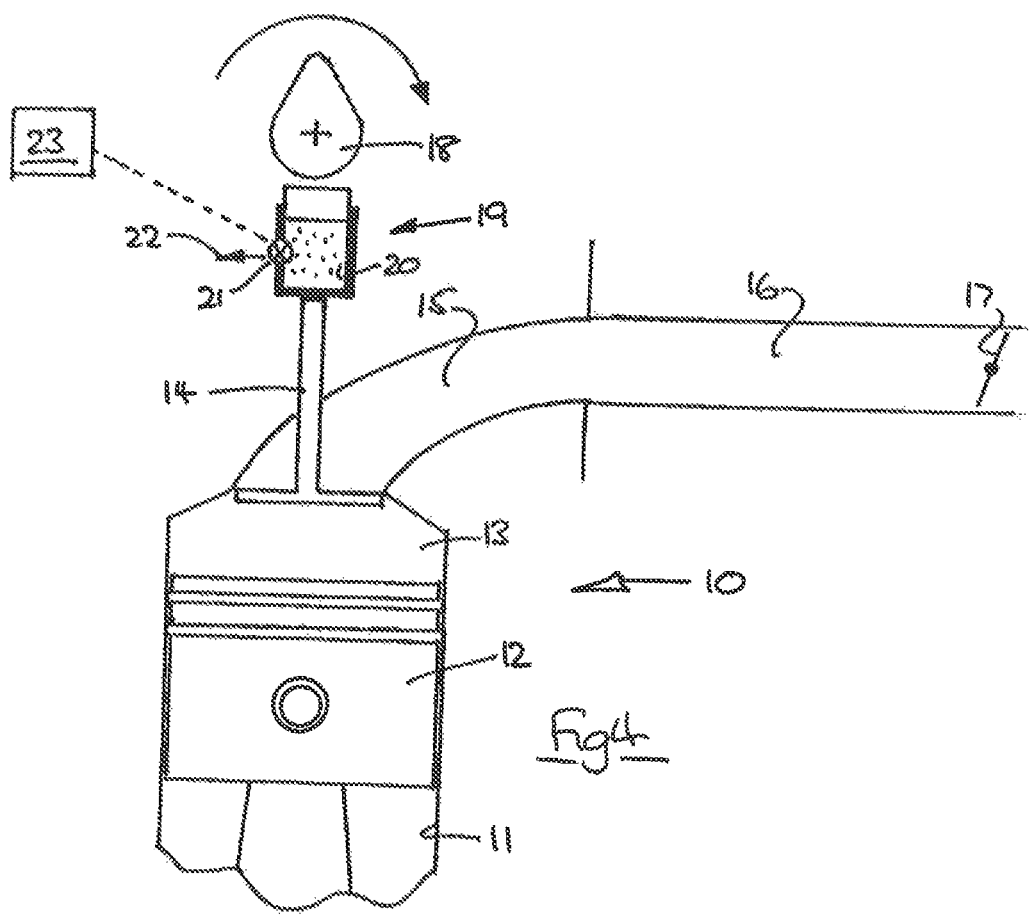
FIG. 4 shows schematically the inlet arrangement of an internal combustion engine to which the invention may be applied.

FIG. 4 shows an internal combustion engine 10 having a cylinder 11 within which a piston 12 reciprocates. A combustion chamber 13 is defined above the piston, and contains a poppet valve 14 which is opened to admit air from an inlet port 15. The inlet port is fed from an inlet manifold 16, at the mouth of which is provided a throttle valve 17.

The poppet valve 14 is closed by a spring (not shown), and is opened by action of a rotatable cam 18 which is conventionally provided by a lobe of a camshaft (not shown) between the cam 18 and the valve 14 is provided a tappet 19.

The generally arrangement of FIG. 4 is very common, and for ease of illustration certain other components, such as a corresponding poppet exhaust valve, are not illustrated.

The tappet of FIG. 4 is active, and adjustable in length by relative inward and outward movement of the components thereof, so that the lift of the valve may be varied between minimum and maximum. The kind of active tappet is not important save that it should permit fast variation of valve lift on an event basis. Thus it is envisaged that valve lift may be varied at each successive opening thereof, if required. FIG. 4 illustrates by way of example a schematic electro-hydraulic tappet 19 having a hydraulic chamber 20 supplied with oil at a steady rate and a solenoid operated bleed valve 21 to allow a varying volume of oil to escape, as indicated by arrow 22. Operation of the valve 21 is by electronic signal from an ECU 23.

One example of an active tappet is disclosed in EP-A-2511504, and relies upon such an electro-hydraulic device having a hydraulic chamber of variable volume.

In use the admission of air into the engine is controlled via the throttle valve 17, which in turn is commanded by the ECU 23 according to conventional control parameters such as accelerator pedal position, altitude, air temperature and the like. It will be understood an alteration of the position of the throttle valve 17 changes the rate of air inflow, but does not immediately influence the amount of air admitted to the combustion chamber because of the air volume contained in the inlet manifold 16 and inlet tract 15. Accordingly immediate control of knock by variation of the position of the throttle valve is not possible.

In the method of the invention, admission of air into the engine is varied by use of an active tappet, according to a knock sensor, to substantially reduce or eliminate knock. Variation of air admission may be used alone to counter knock, or may be used in conjunction with ignition retardation, as will become apparent from the following description. The invention has particular application to a multi-cylinder spark ignition engine.

In a first embodiment combustion knock is controlled by commanding the or each active tappet to reduce the air charge in the cylinder(s) in which combustion knock is detected. The air charge may be reduced progressively on a cylinder by cylinder basis, for each successive combustion event, until knocking is no longer detected.

Combustion knock may be treated in this manner solely by control of the active tappets, but in most cases will be used in conjunction with a retarding of the ignition spark so as to achieve best overall combustion efficiency with minimum fuel consumption. The use of the active tappets to individually control air charge may be used particularly in that area of the engine speed/load map where knocking is most prevalent, and where the engine may otherwise require to be knock limited.

As demonstrated in FIG. 3, retarding of ignition can generally be used without a serious effect on overall combustion efficiency, but it will be understood that the allowable amount of retardation is governed by the particular engine and the condition thereof; the characteristic of FIG. 3 can be determined empirically by conventional methods.

A suitable control cycle, for each cylinder, will allow the active tappets to increase the air charge on successive combustion cycles in a knock approaching manner so as to allow an engine to be operated as close to the knock limit as possible. The size and type of each progressive air charge reduction associated with treating combustion knock is selected to give an acceptable control response, and may be equal to, or different from any corresponding progressive increase in air charge.

In an embodiment, the invention allows variation of air charge in conditions where the engine operating temperature is high, for example when the engine is operating in high ambient temperatures or when towing. In this circumstance, treatment of combustion knock by retarding the ignition can be counterproductive, because retarded ignition generally results in additional waste heat to be absorbed by the engine cooling system, which in turns leads to a hotter engine and a further demand for ignition retard.

In such circumstances, a threshold engine temperature (set for example according to vehicle type and specification) may be selected, above which combustion knock is controlled solely by variation of air charge via the active tappets. Increased heat generation and thus heat input to the engine is thereby avoided, whilst providing an effective treatment of combustion knock.

An embodiment concerns the variation of an ignition timing system in conjunction with active tappets to best optimise combustion under selected condition of engine speed and load. The use of active tappets provides for an additional control parameter (air charge volume) to ensure that optimum fuel economy can be substantially achieved at all desired parts on the engine load/speed map.

An important aspect of the invention relates to the treatment of combustion knock where a lower octane fuel is provided to the combustion chamber. Such fuels (depending on engine type and state of time) tend to exacerbate combustion knock and conventionally require a large amount of ignition retardation in a spark ignition engine. In turn this produces additional waste heat, which in turn results in engine and exhaust temperatures which may be considered too high.

In this aspect, variation of air charge using active tappets allows lower octane fuels, including very low octane fuels approaching 80 RON, to be safely used without risk of combustion knock. In the case of the lowest octane ratings, air charge reduction and ignition timing retardation may be used in conjunction to protect the engine from damage due to combustion knock.

The ability to treat combustion knock by air charge variation, on a cylinder by cylinder basis and in a different amount for successive combustion events, allows the smoothness of engine operation to be improved. One embodiment of the invention treats the cylinder with a combustion knock which is more than any other cylinder, so as to promote equalisation of combustion events in different cylinders. The treated cylinder may vary continually so as to achieve smooth running for all conditions of engine speed and load, and a particular advantage of an active tappet is the ability to respond differently for successive combustion cycles.

As noted above, the air charge is reduced when responding to combustion knock, either by directly influencing the volume of the incoming air charge, or by ensuring that a greater proportion of combustion gases remain in the combustion chamber after combustion.

It will be understood that each engine equipped with active tappets will have different characteristics, which can be determined empirically by conventional methods. In addition, the installation of the engine will also affect the prevalence of combustion knock, in particular according to the amount of cooling provided by the engine cooling system.

Accordingly, the values of air charge variation will vary from case to case, but can be selected to the intent that combustion knock be limited in all circumstances of use, and on a cylinder by cylinder basis within one combustion cycle.

Although described in relation to a cam operated valve, it will be understood that an active tappet may be used independently of a cam to activate a valve, and may replace such a cam rather than modify the lift thereof.

The embodiments described above are by way of example only, and not intended to restrict the invention.

The invention claimed is:

1. A method of combustion knock control in a spark ignition reciprocating piston internal combustion engine having a combustion chamber, an inlet valve at an inlet to said combustion chamber, and an active tappet for said inlet valve whereby valve operation may be adjusted on demand, the method comprising:
    selecting and using a first one of two modes of combustion knock control in dependence on a temperature of the spark ignition reciprocating piston internal combustion engine exceeding a predetermined threshold operating temperature;
    continuing to use the first one of the two modes of combustion knock control until the temperature of the spark ignition reciprocating piston internal combustion engine drops below the predetermined threshold operating temperature; and
    subsequently selecting and using a second one of the two modes of combustion knock control instead of the first one of the two modes of combustion knock control in dependence on the temperature of the spark ignition reciprocating piston internal combustion engine dropping below the predetermined threshold operating temperature, wherein:
        a timing of an ignition spark has a value at a time of the temperature of the spark ignition reciprocating piston internal combustion engine exceeding said predetermined threshold operating temperature;
        said first one of two modes of combustion knock control comprises
            maintaining the timing of the ignition spark fixed at the value until the temperature of the spark ignition reciprocating piston internal combustion drops below said threshold operating temperature, and
            controlling knock solely by varying an air charge of the combustion chamber by controlling the active tappet while maintaining the timing of the ignition spark fixed at the value; and
        said second one of the two modes of combustion knock control comprises varying the air charge of the combustion chamber by controlling the active tappet and varying the timing of the ignition spark.

2. The method according to claim 1, wherein said operation of said active tappet comprises commanding at least re-timing an opening of the inlet valve to increase overlap with operation of at least one exhaust valve of said combustion chamber so as to increase a duration over which the inlet valve and said at least one exhaust valve are open simultaneously or to reduce overlap with operation of the at least one exhaust valve of said combustion chamber so as to reduce the duration over which the inlet valve and said at least one exhaust valve are open simultaneously.

3. The method according to claim 1, wherein above said threshold operating temperature, combustion knock is treated by commanding said active tappet to reduce the air charge in said combustion chamber.

4. The method according to claim 1, wherein the inlet valve is a poppet valve, and wherein the spark ignition reciprocating piston internal combustion engine has an inlet manifold upstream of said inlet valve, and a throttle valve at an inlet to said inlet manifold.

5. An electronic control unit configured to control an internal combustion engine having a combustion chamber, an inlet valve at an inlet to said combustion chamber, and an active tappet for said inlet valve whereby valve operation may be adjusted on demand, the electric control unit comprising:
    a processor; and
    a memory associated with the processor, the memory containing parameters defining two modes of combustion knock control,
    wherein the processor is configured to control combustion knock by
    selecting and using a first one of two modes of combustion knock control in dependence on a temperature of the internal combustion engine exceeding a predetermined threshold operating temperature;
    continuing to use the first one of the two modes of combustion knock control until the temperature of the internal combustion engine drops below the predetermined threshold operating temperature; and
    subsequently selecting and using a second one of the two modes of combustion knock control instead of the first one of the two modes of combustion knock control in dependence on the temperature of the internal combustion engine dropping below the predetermined threshold operating temperature,
    wherein:
        a timing of an ignition spark has a value at a time of the temperature of the internal combustion engine exceeding said predetermined threshold operating temperature;
        said first one of two modes of combustion knock control comprises
            maintaining the timing of the ignition spark fixed at the value until the temperature of the internal combustion engine subsequently drops below said threshold operating temperature, and
            controlling knock solely by varying an air charge of the combustion chamber by controlling the active tappet while maintaining the timing of the ignition spark fixed at the value; and
        said second one of the two modes of combustion knock control comprises varying the air charge of the combustion chamber by controlling the active tappet and varying the timing of the ignition spark.

6. The electronic control unit of claim 5, wherein operation of said active tappet comprises commanding at least re-timing an opening of the inlet valve to increase overlap with operation of at least one exhaust valve of said combustion chamber so as to increase a duration over which the inlet valve and said at least one exhaust valve are open simultaneously or to reduce overlap with operation of the at least one exhaust valve of said combustion chamber so as to reduce the duration over which the inlet valve and said at least one exhaust valve are open simultaneously.

7. A system comprising:
    an internal combustion engine including a combustion chamber, an inlet valve at an inlet to said combustion chamber, and an active tappet for said inlet valve whereby valve operation may be adjusted on demand; and
    an electronic control unit configured to control combustion knock of the internal combustion engine by
    selecting and using a first one of two modes of combustion knock control in dependence on a temperature of the internal combustion engine exceeding a predetermined threshold operating temperature;
    continuing to use the first one of the two modes of combustion knock control until the temperature of the internal combustion engine drops below the predetermined threshold operating temperature; and
    subsequently selecting and using a second one of the two modes of combustion knock control instead of the first one of the two modes of combustion knock control in dependence on the temperature of the internal combustion engine dropping below the predetermined threshold operating temperature,
wherein:
  a timing of an ignition spark has a value at a time of the temperature of the internal combustion engine exceeding said predetermined threshold operating temperature;
  said first one of two modes of combustion knock control comprises
    maintaining the timing of the ignition spark fixed at the value until the temperature of the internal combustion engine subsequently drops below said threshold operating temperature, and
    controlling knock solely by varying an air charge of the combustion chamber by controlling the active tappet while maintaining the timing of the ignition spark fixed at the value; and
  said second one of the two modes of combustion knock control comprises varying the air charge of the combustion chamber by controlling the active tappet and varying the timing of the ignition spark.

8. The system of claim 7, wherein
  the active tappet comprises an electro-hydraulic actuation device for continuously varying a valve lift of said inlet valve.

9. The system of claim 8, wherein
  the active tappet is between a cam and the inlet valve, and
  the active tappet is for continuously varying the valve lift of the inlet valve independently of the cam.

10. The system of claim 7, wherein operation of said active tappet comprises commanding at least re-timing an opening of the inlet valve to increase overlap with operation of at least one exhaust valve of said combustion chamber so as to increase a duration over which the inlet valve and said at least one exhaust valve are open simultaneously or to reduce overlap with operation of the at least one exhaust valve of said combustion chamber so as to reduce the duration over which the inlet valve and said at least one exhaust valve are open simultaneously.

11. A vehicle comprising the system of claim 7.

* * * * *